(No Model.)
W. C. WILLIAMS.
THILL COUPLING.
No. 479,146.  Patented July 19, 1892.
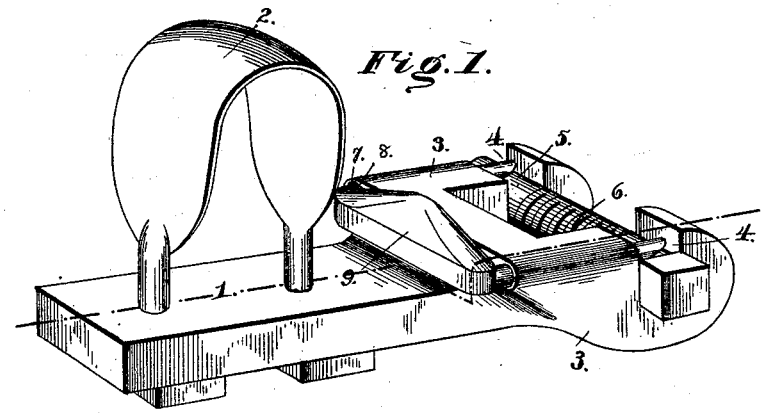
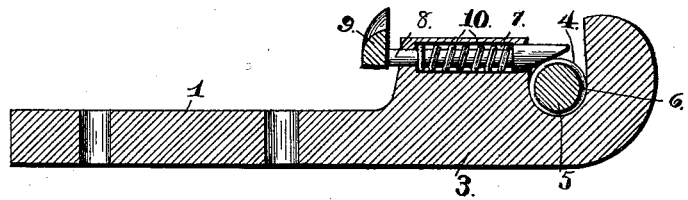
Witnesses  Inventor
Chas. A. Ford  W. C. Williams.
N. F. Riley  By his Attorneys,
  C. A. Snow & Co.
THE NORRIS PETERS CO., PHOTO-LITHO., WASHINGTON, D. C.

UNITED STATES PATENT OFFICE.

WILLARD CORDELIUS WILLIAMS, OF RUSH CREEK VALLEY, ASSIGNOR OF ONE-HALF TO LEVI S. SANDERS, OF CAMPBELLSVILLE, INDIANA.

THILL-COUPLING.

SPECIFICATION forming part of Letters Patent No. 479,146, dated July 19, 1892.

Application filed January 5, 1892. Serial No. 417,073. (No model.)

*To all whom it may concern:*

Be it known that I, WILLARD CORDELIUS WILLIAMS, a citizen of the United States, residing at Rush Creek Valley, in the county of Washington and State of Indiana, have invented a new and useful Thill-Coupling, of which the following is a specification.

The invention relates to improvements in thill-couplings and anti-rattlers.

The object of the present invention is to simplify and improve the construction of anti-rattler thill-couplings and to provide one which will enable shafts to be readily coupled and uncoupled and which will prevent noise and rattling.

The invention consists in the construction and novel combination and arrangement of parts hereinafter fully described, illustrated in the accompanying drawings, and pointed out in the claim hereto appended.

In the drawings, Figure 1 is a perspective view of a portion of a thill-coupling constructed in accordance with this invention. Fig. 2 is a longitudinal sectional view.

Like numerals of reference indicate corresponding parts in both the figures of the drawings.

1 designates a clip-plate, which is secured to an axle by a clip 2 and which has its forward end enlarged and provided with forwardly-projecting ears 3, having open bearings 4 to receive a coupling-bolt 5. The coupling-bolt 5 is provided intermediate its ends with a threaded portion 6, which is designed to be screwed into the eye of a shaft-iron, (not shown,) and the ends of the bolt are arranged in the bearings 4 and form journals. The forwardly-projecting ears 3 are provided with longitudinally-disposed openings 7, which communicate with the open bearings near the tops of the same and which are adapted for the reception of spring-actuated bolts 8. The bolts 8 have their rear ends connected by a cross-piece 9, so that they may both be retracted against the action of the springs 10 by moving the cross-piece rearward. The forward ends of the spring-actuated bolts project into the bearings 4 and engage the upper face of the bolt and serve to retain the coupling-bolt in the bearings by partially closing the latter and to prevent noise and rattling by bearing against the coupling-bolt, and the lower faces of the front ends of the spring-actuated bolts are beveled slightly. The spiral springs are disposed on the bolts 8 and have their forward ends engaging shoulders of the bolts 8 and their rear ends engaging stops or shoulders of the clip-plate. The cross-piece 9 is provided with a raised center or lip, forming a thumb-piece by means of which the spring-actuated bolts may be operated.

It will be seen that the combined thill-coupling and anti-rattler is simple and comparatively inexpensive in construction, that it will permit shafts to be readily coupled and uncoupled, and that it effectually prevents noise and rattling.

What I claim is—

In a thill-coupling, the combination of a clip-plate provided with forwardly-projecting ears having open bearing-recesses and provided with longitudinal bolt-openings arranged at the upper ends of the bearing-recesses and disposed at right angles thereto, bolts arranged in the bolt-openings and closing the mouths of the bearing-recesses, spiral springs disposed on the bolts and arranged within the bolt-openings and bearing against the rear walls of the latter and shoulders of the bolts, a cross-piece connecting the rear ends of the bolts and provided with a central lip, and a coupling-bolt arranged within the recesses of the ears and secured therein by the spring-actuated bolts, substantially as described.

In testimony that I claim the foregoing as my own I have hereto affixed my signature in the presence of two witnesses.

WILLARD CORDELIUS WILLIAMS.

Witnesses:
W. G. WILLIAMS,
ELIJAH DRISKELL.